(12) United States Patent
He

(10) Patent No.: US 11,729,890 B2
(45) Date of Patent: Aug. 15, 2023

(54) SHOE LIGHT DEVICE CAPABLE OF FLASHING IN DIFFERENT MODES AND DRIVING METHOD THEREOF

(71) Applicant: Fully Electronics Co., Ltd., Fujian (CN)

(72) Inventor: Jinchun He, Fujian (CN)

(73) Assignee: FULLY ELECTRONICS CO., LTD.

(*) Notice: Subject to any disclaimer, the term of this patent is extended or adjusted under 35 U.S.C. 154(b) by 0 days.

(21) Appl. No.: 17/938,571

(22) Filed: Oct. 6, 2022

(65) Prior Publication Data

US 2023/0022997 A1  Jan. 26, 2023

Related U.S. Application Data

(63) Continuation of application No. 17/361,139, filed on Jun. 28, 2021, now Pat. No. 11,483,915, which is a
(Continued)

(51) Int. Cl.
| | |
|---|---|
| *H05B 47/17* | (2020.01) |
| *H05B 45/10* | (2020.01) |
| *A43B 3/36* | (2022.01) |
| *F21S 9/02* | (2006.01) |
| *F21S 10/06* | (2006.01) |
| *F21V 23/00* | (2015.01) |

(Continued)

(52) U.S. Cl.
CPC ............... *H05B 47/17* (2020.01); *A43B 3/36* (2022.01); *F21S 9/02* (2013.01); *F21S 10/06* (2013.01); *F21V 23/007* (2013.01); *F21V 23/0407* (2013.01); *F21V 23/0492* (2013.01); *H01H 1/14* (2013.01); *H01H 13/14* (2013.01); *H05B 45/10* (2020.01); *F21Y 2115/10* (2016.08)

(58) Field of Classification Search
CPC ...... H05B 47/17; H05B 47/115; H05B 45/10; H05B 45/30; F21V 23/007; F21V 23/0407; F21V 23/0492; F21V 33/0008; A43B 3/36; A43B 3/40; A43B 3/44; F21S 9/02; F21S 10/06; H01H 1/14; H01H 13/14; F21Y 2115/10; Y02B 20/40
See application file for complete search history.

(56) References Cited

U.S. PATENT DOCUMENTS

| | | |
|---|---|---|
| 4,848,009 A | 7/1989 | Rogers |
| 5,343,445 A | 8/1994 | Cherdak |

(Continued)

*Primary Examiner* — Haissa Philogene
(74) *Attorney, Agent, or Firm* — McHale & Slavin, P.A.

(57) ABSTRACT

The invention relates to the technical field of shoe lights; in particular, to a shoe light device capable of flashing in different modes and a driving method thereof. A motion sensor, an integrated chip and a light-emitting device are integrated on a shoe, and the motion sensor and the light-emitting device are electrically connected to the integrated chip. The integrated chip is configured to control the light-emitting device to emit light in a preset constant-sequence output mode when the duration of reception of pulse signals generated by the motion sensor reaches a preset threshold, so that trigger control over the light-emitting device is realized. The shoe light device capable of flashing in different modes has the advantages of high integrity of elements, simple structure, simple production process, and various integrated cyclic output modes for flashing of the light-emitting device.

14 Claims, 13 Drawing Sheets

Related U.S. Application Data continuation-in-part of application No. 17/029,207, filed on Sep. 23, 2020, now abandoned.

(51) Int. Cl.
  *F21V 23/04* (2006.01)
  *H01H 1/14* (2006.01)
  *H01H 13/14* (2006.01)
  *F21Y 115/10* (2016.01)

(56) References Cited

U.S. PATENT DOCUMENTS

| | | |
|---|---|---|
| 5,456,032 A | 10/1995 | Matsumoto et al. |
| 5,457,900 A | 10/1995 | Roy |
| 5,640,786 A | 6/1997 | Buyayez |
| 5,644,858 A | 7/1997 | Bemis |
| 5,812,063 A | 9/1998 | Weng et al. |
| 5,813,148 A | 9/1998 | Guerra |
| 5,839,814 A | 11/1998 | Roberts |
| 5,903,103 A | 5/1999 | Garner |
| 5,932,975 A | 8/1999 | Wut |
| 5,969,479 A | 10/1999 | Wong |
| 6,280,045 B1 | 8/2001 | Anteby et al. |
| 6,776,498 B2 | 8/2004 | Yeung |
| 6,843,578 B1 | 1/2005 | Cheung |
| 7,405,674 B2 | 7/2008 | Tseng |
| 7,452,106 B2 | 11/2008 | Tseng |
| 7,866,066 B2 | 1/2011 | Forbes |
| 11,483,915 B2 * | 10/2022 | He ................... H01H 1/14 |
| 11,525,563 B2 * | 12/2022 | Tseng ................ H05B 45/20 |
| 11,586,164 B2 * | 2/2023 | Siagian ............. H05B 45/20 |
| 2001/0044580 A1 | 11/2001 | Pellegretti et al. |
| 2011/0265344 A1 | 11/2011 | Sanabria-Hernandez |
| 2015/0237949 A1 * | 8/2015 | Poulos .............. A43B 1/0027 36/137 |
| 2016/0242490 A1 * | 8/2016 | Sander ................ A43B 13/12 |
| 2017/0049420 A1 | 2/2017 | Shikama et al. |
| 2019/0082756 A1 | 3/2019 | Amos |
| 2021/0087738 A1 | 3/2021 | Chieffi et al. |

\* cited by examiner

SHOE LIGHT DEVICE CAPABLE OF FLASHING IN DIFFERENT MODES AND DRIVING METHOD THEREOF

PRIORITY CLAIM

In accordance with 37 C.F.R. 1.76, a claim of priority is included in an Application Data Sheet filed concurrently herewith. Accordingly, the present invention claims priority as a Continuation of U.S. patent application Ser. No. 17/361, 139, entitled "SHOE LIGHT DEVICE CAPABLE OF FLASHING IN DIFFERENT MODES AND DRIVING METHOD THERE", filed Jun. 28, 2021; which was a Continuation of U.S. Non-Provisional patent application Ser. No. 17/029,207, entitled "SHOE LIGHT DEVICE CAPABLE OF FLASHING IN DIFFERENT MODES AND DRIVING METHOD THEREOF", filed Sep. 23, 2020. The contents of the above referenced applications are incorporated herein by reference in their entirety.

TECHNICAL FIELD

The invention relates to the technical field of shoe lights, in particular to a shoe light device capable of flashing in different modes and a driving method thereof.

DESCRIPTION OF RELATED ART

Common shoe light devices on the present market have the defects of complicated electrical structure, high standby power consumption (which is 3-5UA), low input voltage (which is 3-5V), complicated production process, difficult quality control, single flashing mode and incontrollable display brightness.

SUMMARY OF THE INVENTION

The technical issue to be settled by the invention is to provide a shoe light device capable of flashing in different modes and a driving method thereof to solve the above-mentioned problems.

One technical solution adopted by the invention to settle the aforesaid technical issue is as follows:

A shoe light device capable of flashing in different modes comprises a motion sensor, an integrated chip and a light-emitting device, wherein the motion sensor is disposed at the bottom of a shoe, the integrated chip is disposed on the shoe, the light-emitting device is disposed on an outer wall of the shoe, and the motion sensor and the light-emitting device are electrically connected to the integrated chip; and the integrated chip is configured to control the light-emitting device to emit light in a preset constant-sequence output mode when the duration of reception of pulse signals generated by the motion sensor reaches a preset threshold.

Another technical solution adopted by the invention is as follows:

A driving method of the shoe light device capable of flashing in different modes comprises the following steps:

Sending a series of pulse signals to the integrated chip when the motion sensor recognizes a resilience force generated at the moment the bottom of the shoe touches the ground;

Receiving and counting the pulse signals by the integrated chip, and recording the time at this moment to obtain the duration of reception of the pulse signals; and Determining, by the integrated chip, whether or not the duration of reception of the pulse signals reaches a preset threshold; if so, controlling, by the integrated chip, the light-emitting device to emit light in a preset constant-sequence output mode.

The invention has the following beneficial effects:

According to the shoe light device capable of flashing in different modes and the driving method thereof, the motion sensor, the integrated device and the light-emitting device are integrated on the shoe, and the motion sensor and the light-emitting device are electrically connected to the integrated chip; the integrated chip is configured to control the light-emitting device to emit light in a preset constant-sequence output mode when the duration of reception of pulse signals generated by the motion sensor reaches a preset threshold, to that trigger control over the light-emitting device is realized. The hose light device capable of flashing in different modes provided by the invention has the advantages of high integrity of elements, simple structure, simple production process and various integrated cyclic output modes for flashing on the light-emitting device.

Figure 1:
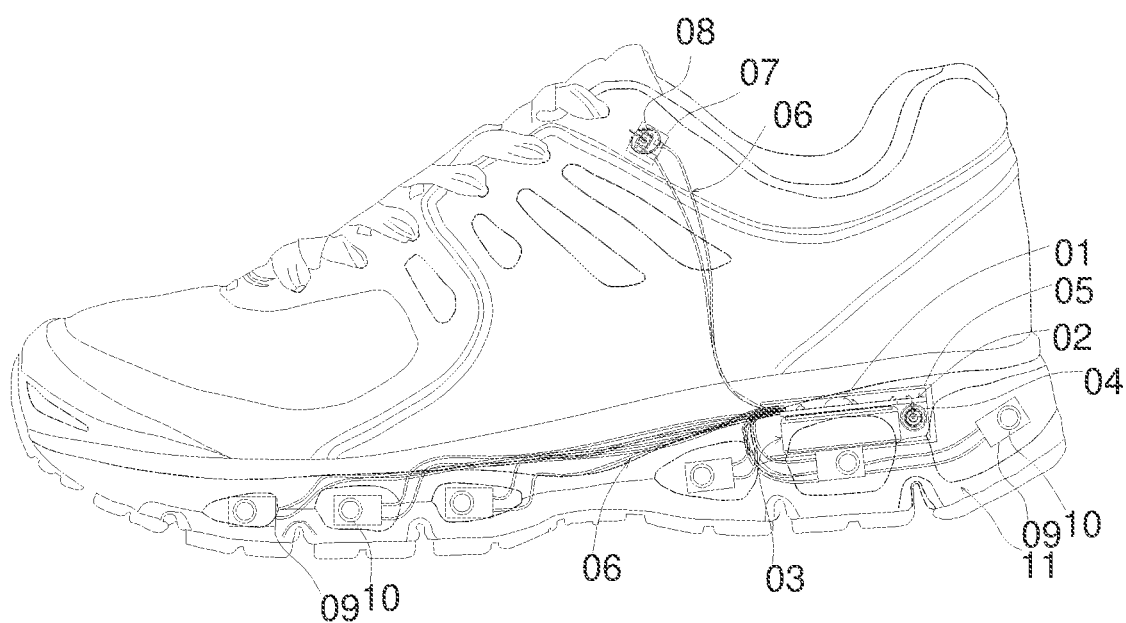
FIG. 1 is a structural diagram of a shoe light device capable of flashing in different modes of the invention.
Figure 2:
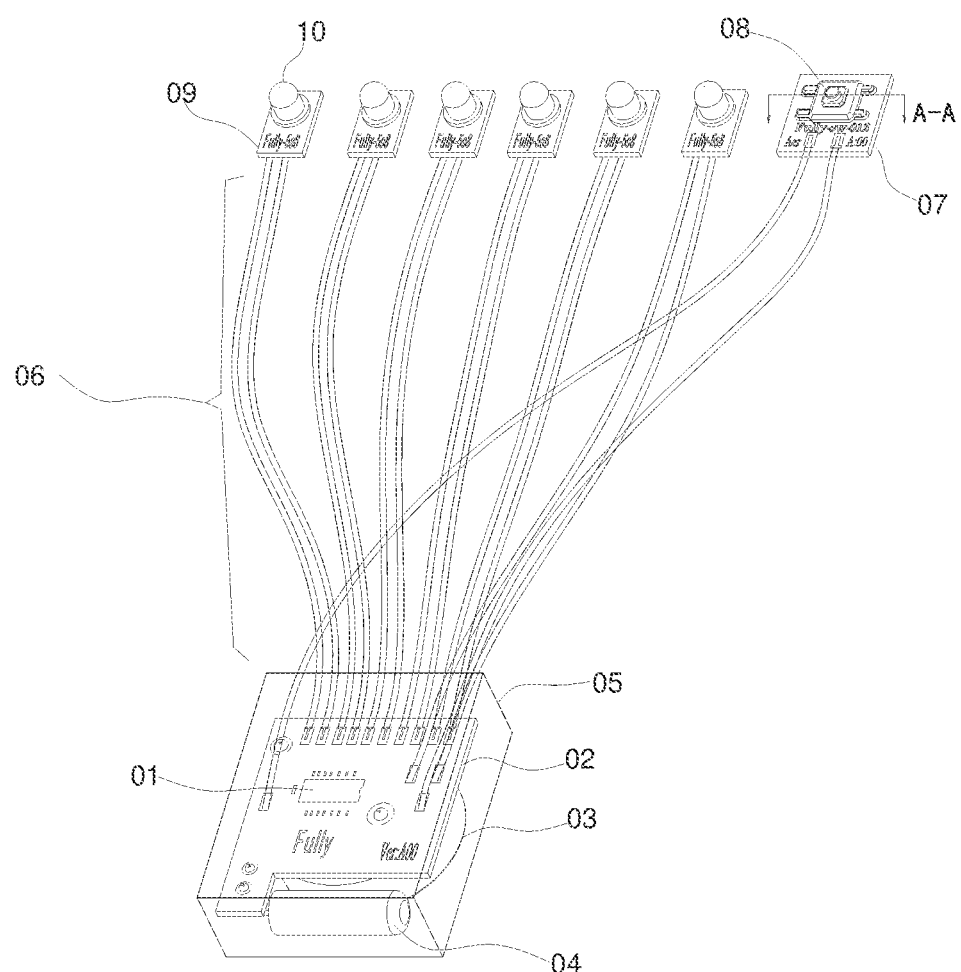
FIG. 2 is an electrical connection diagram of the shoe light device capable of flashing in different modes of the invention.
Figure 3:
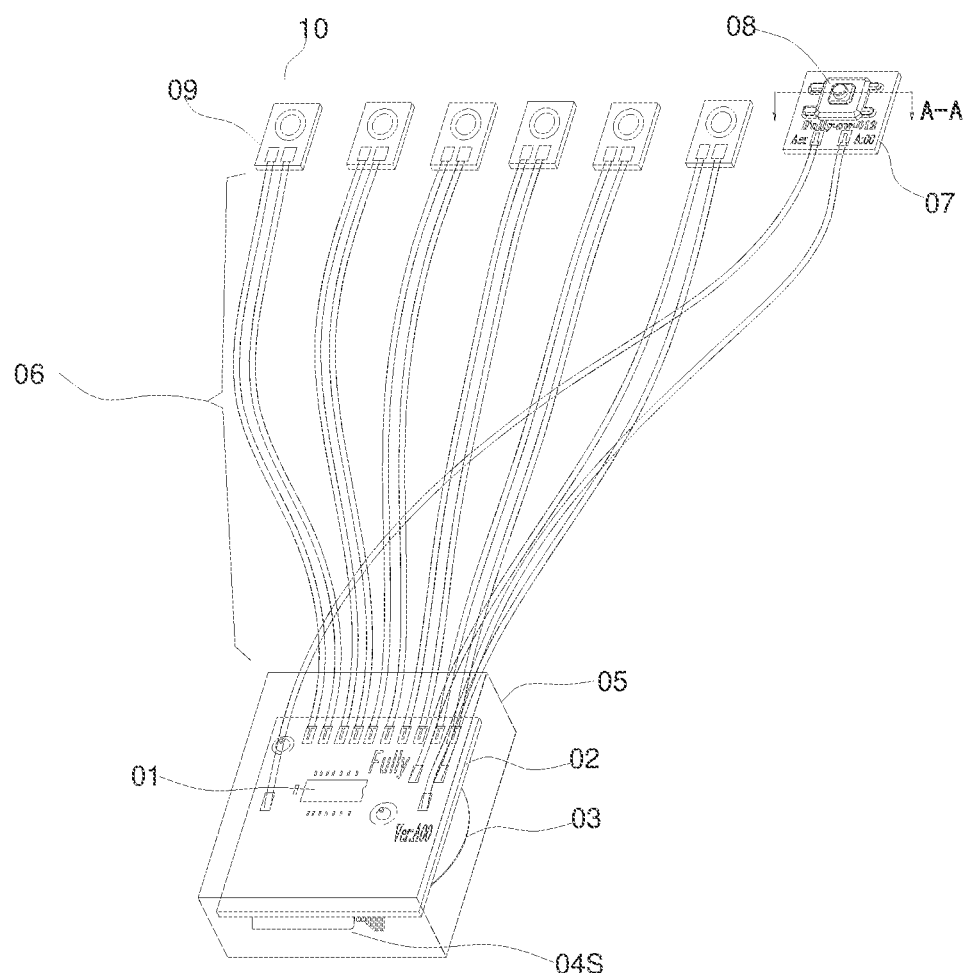
FIG. 3 is an electrical connection diagram of the shoe light device capable of flashing in different modes of the invention.
Figure 4:
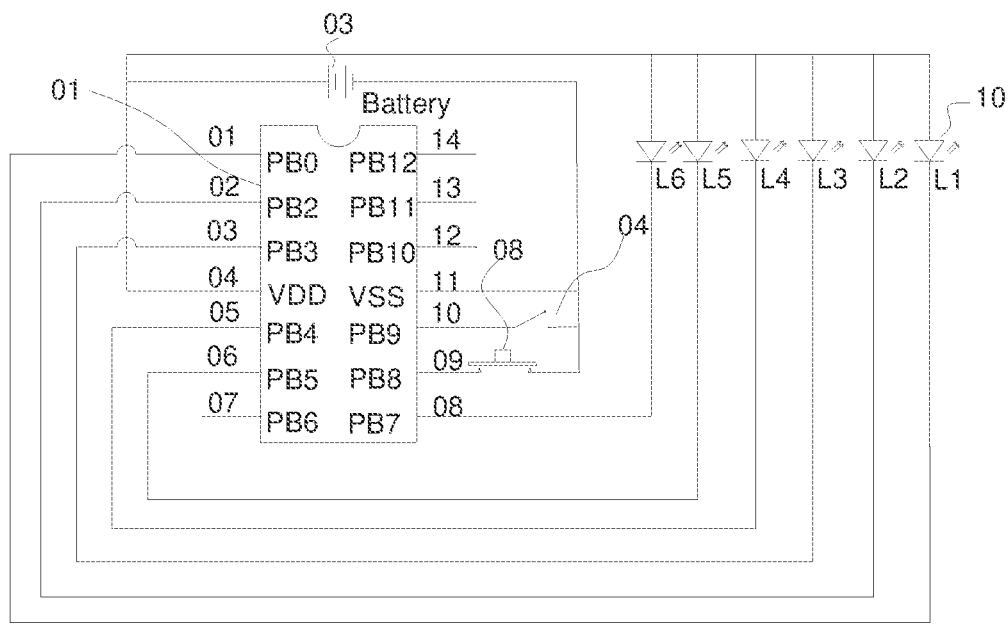
FIG. 4 is a circuit diagram of the shoe light device capable of flashing in different modes of the invention.

REFERENCE SIGNS 01, integrated chip (IC);
02, first circuit board;
03, power supply battery;
04, motion sensor; 041, spindle; 042, spring; 043, silicone; 044, shell;
04S, motion sensor; 042S, spring; 042SA, spring welding end; 042SB, spring
operating end; 043S, spring fastener; 044S, metal shell;
05, bottom control box;
06, electronic connecting wire;
07, base plate;
08, control button; 082, arc metal shrapnel; 083, positive metal contact; 084,
negative metal contact; 085, key; 086, injection-molded plastic part; 087,
metal casing;
09, second circuit board;
10, LED light;
11, shoe outsole.

DETAILED DESCRIPTION OF THE INVENTION

The technical contents, purposes and effects of the invention are expounded below in conjunction with the embodiments and accompanying drawings.

Referring to FIG. 1 to FIG. 18, the invention provides a shoe light device capable of flashing in different modes, which comprises a motion sensor, an integrated chip and a light-emitting device, wherein the motion sensor is disposed at the bottom of a shoe, the integrated chip is disposed on the shoe, the light-emitting device is disposed on an outer wall of the shoe, and the motion sensor and the light-emitting device are electrically connected to the integrated chip; and the integrated chip is configured to control the light-emitting device to emit light in a preset constant-sequence output mode when the duration of reception of pulse signals generated by the motion sensor reaches a preset threshold.

From the above description, the invention has the following beneficial effects:

According to the shoe light device capable of flashing in different modes, the motion sensor, the integrated device and the light-emitting device are integrated on the shoe, and the motion sensor and the light-emitting device are electrically connected to the integrated chip; the integrated chip is configured to control the light-emitting device to emit light in a preset constant-sequence output mode when continuously receiving pulse signals generated by the motion sensor for a preset threshold, so that trigger control over the light-emitting device is realized. The shoe light device capable of flashing in different modes provided by the invention has the advantages of high integrity of elements, simple structure, simple production process and various integrated cyclic output modes for flashing of the light-emitting device.

Furthermore, the motion sensor comprises a spindle, a spring and a shell, wherein the shell is a cylindrical shell, the spindle and the spring are disposed in the cylindrical shell and are coaxial with the cylindrical shell, the spindle penetrates through the spring, and the spindle and the spring are fixedly connected to the cylindrical shell through silicone.

From the above description, the function of the motion sensor is realized through the specific structure described above.

Furthermore, the motion sensor comprises a spring, a metal shell and a spring fastener, wherein the spring is fixed in the metal shell through the spring fastener.

From the above description, the metal shell and the spring are welded and electrically connected to a pad of a main control panel, where the integrated chip is located, through the above specific structure by means of surface mounting.

Furthermore, the shoe light device capable of flashing in different modes further comprises a bottom control box, wherein the motion sensor and the integrated chip are disposed in the bottom control box, a first circuit is further disposed in the bottom control box, the bottom control box is filled with resin glue for wrapping all devices located in the bottom control box, and the first circuit board is electrically connected to the integrated chip and is electrically connected to the light-emitting device through an external electronic connecting wire.

From the above description, the bottom control box is filled with resin glue to fulfill a waterproof effect and an impact-resistant effect.

Furthermore, a power supply battery is further disposed in the bottom control box and is electrically connected to the integrated chip.

From the above description, the power supply battery is formed by two CR batteries which are connected in series, wherein initial voltage of the CR batteries is 3.4V, and the voltage of the two CR batteries after series connection is 6.8V. Or, the power supply battery is formed by only one CR battery.

Furthermore, the light-emitting device comprises LED lights and a second circuit board, wherein the LED lights are mounted on the second circuit board and the first circuit board is electrically connected to the second circuit board through an external electronic connecting wire.

From the above description, the LED lights are electrically connected to the integrated chip through the structure described above.

Furthermore, the shoe light device capable of flashing in different modes further comprises a control button disposed on the shoe, wherein the control button comprises a key, an arc metal shrapnel, a positive metal contact, a negative metal contact, a metal casing and a base plate.

The positive metal contact and the negative metal contact form a protruding structure through an injection molding process, a clamping notch which is concaved inwards is formed in a position, corresponding to the waist, of the protruding structure, the protruding structure is disposed on the base plate, the bottom of the protruding structure is electrically connected to the base plate, and the arc metal shrapnel, the key and the metal casing are sequentially disposed at the top of the protruding structure, and the metal casing is provided with a through hole allowing the key to stretch out and a clamping hook to be clamped in the clamping notch.

From the above description, the control button is disposed outside through the above structure, and the base plate of the control button is electrically connected to the first circuit board where the integrated chip is located. The clamping hook of the metal casing is clamped in the clamping notch of the protruding structure to realize fixation and positioning of the key and the arc metal shrapnel. The positive metal contact and the negative metal contact are electrically connected to the base plate through welding.

Figure 19:
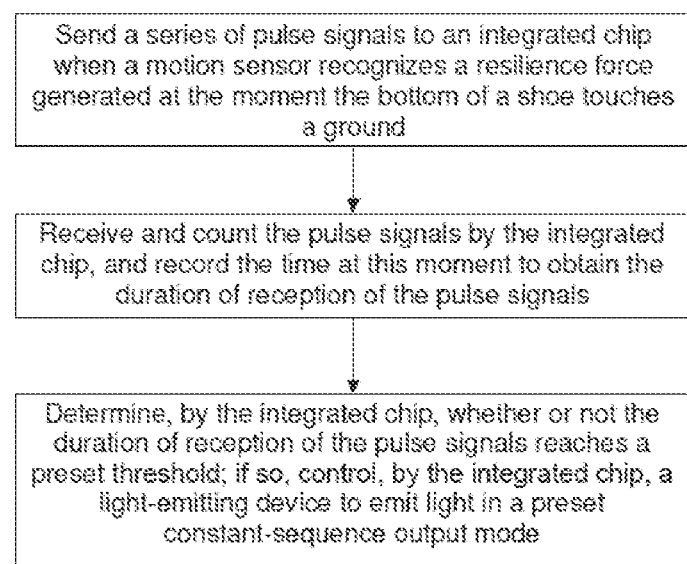
FIG. 19 is a step flow diagram of a driving method of the shoe light device capable of flashing in different modes of the invention.

Referring to FIG. 19, the invention further provides a driving method of the shoe light device capable of flashing in different modes. The driving method comprises the following steps:

When the motion sensor recognizes a resilience force generated at the moment the bottom of the shoe touches the ground, a series of pulse signals is sent to the integrated chip;

The integrated chip receives and counts the pulse signals, and the time at this moment is recorded to obtain the duration of reception of the pulse signals; and The integrated chip determines whether or not the duration of reception of the pulse signals reaches a preset threshold; if so, the integrated chip controls the light-emitting device to emit light in a preset constant-sequence output mode.

From the above description, the invention has the following beneficial effects;

According to the driving method of the shoe light device capable of flashing in different modes, when the motion sensor recognizes a resilience force generated at the moment the bottom of the shoe touches the ground, a series of pulse signals is sent to the integrated chip; the integrated chip receives and counts the pulse signals, and the time at this moment is recorded to obtain the duration of reception of the pulse signals; and the integrated chip determines whether or not the duration of reception of the pulse signals reaches a preset threshold; if so, the integrated chip controls the light-emitting device to emit light in a preset constant-sequence output mode, so that trigger control over the light-emitting device is realized. By adoption of the driving method of the shoe light device capable of flashing in different modes, a shoe light has various integrated cyclic output modes for flashing.

Furthermore, the preset threshold is 10 milliseconds.

From the above description, when the duration of reception of the pulse signals reaches 10 milliseconds, all the modules in the integrated chip will be triggered to realize switch a standby dormant state to an operating mode, and the LED lights are driven to emit light in a constant-sequence output mode.

Furthermore, the driving method further comprises the following step:

The integrated chip receives a signal input through the control button, and an output in a corresponding mode is implemented according to the signal input through the control button.

From the above description, different signals can be input through the external control button to implement outputs in different modes.

Referring to FIG. 1 to FIG. 18, Embodiment 1 of the invention is as follows:

As shown in FIG. 1 to FIG. 4, the invention provides a shoe light device capable of flashing in different modes. The shoe light device capable of flashing in different modes comprises a motion sensor, an integrated chip and a light-emitting device, wherein the motion sensor is disposed at the bottom of a shoe, the integrated chip is disposed on the shoe, the light-emitting device is disposed on an outer wall of the shoe, and the motion sensor and the light-emitting device are electrically connected to the integrated chip; and the integrated chip is configured to control the light-emitting device to emit light in a preset constant-sequence output mode when the duration of reception of pulse signals generated by the motion sensor reaches a preset threshold.

Figure 5:
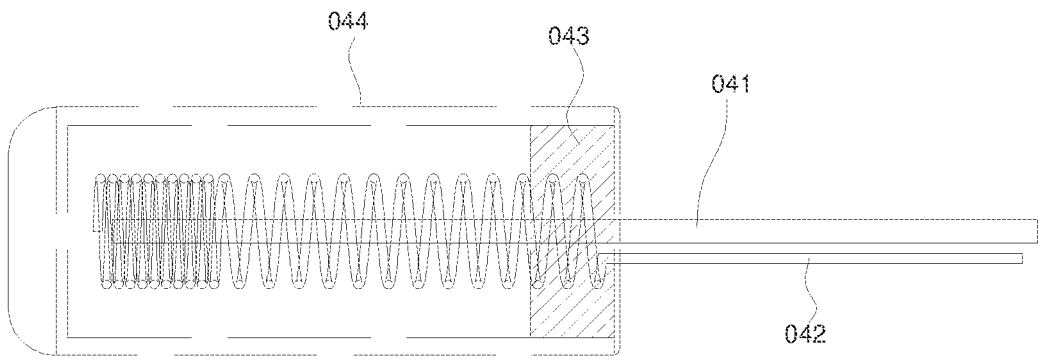
FIG. 5 is a schematic diagram of the shoe light device capable of flashing in different modes of the invention when a first motion sensor is in a static state.
Figure 6:
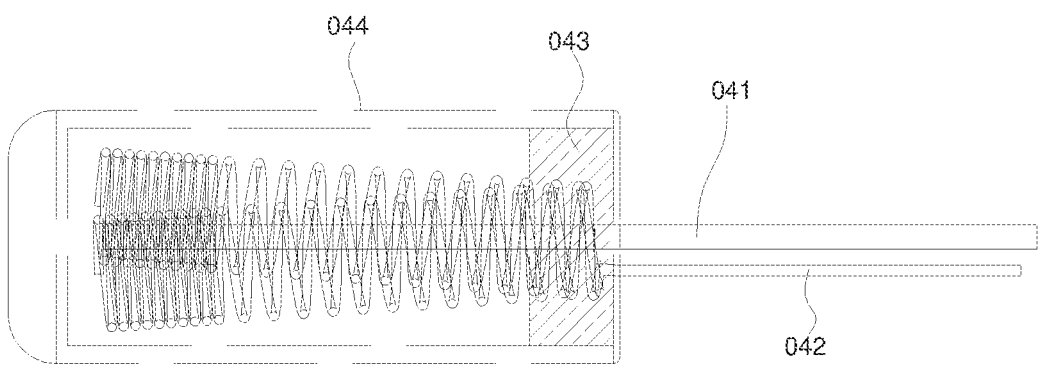
FIG. 6 is a schematic diagram of the shoe light device capable of flashing in different modes of the invention when the first motion sensor is in a dynamic state.

As shown in FIG. 5 and FIG. 6, the motion sensor comprises a spindle, a spring and a shell, wherein the shell is a cylindrical shell, the spindle and the spring are disposed in the cylindrical shell and are coaxial with the cylindrical shell, the spindle penetrates through the spring, and the spindle and the spring are fixedly connected to the cylindrical shell through silicone.

Figure 7:
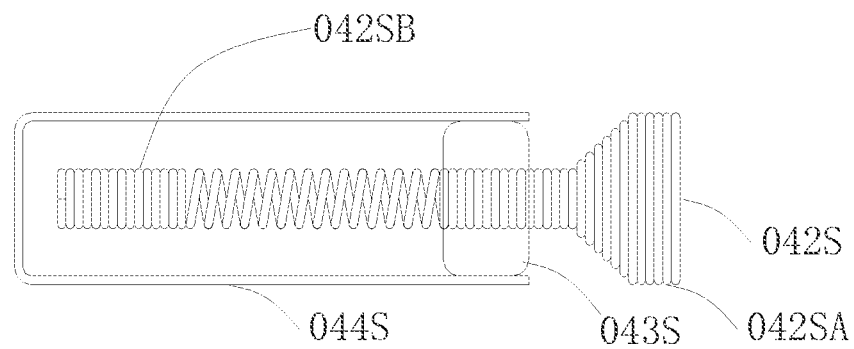
FIG. 7 is a schematic diagram of the shoe light device capable of flashing in different modes of the invention when a second motion sensor is in a static state.
Figure 8:
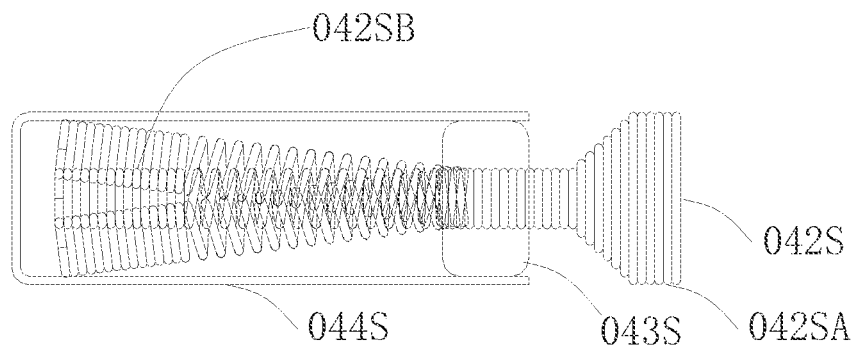
FIG. 8 is a schematic diagram of the shoe light device capable of flashing in different modes when the second motion sensor of the invention is in a dynamic state.

Or, as shown in FIG. 7 and FIG. 8, the motion sensor comprises a spring, a metal shell and a spring fastener, wherein the spring is fixed in the metal shell through the spring fastener.

As shown in FIG. 1 to FIG. 4, the shoe light device capable of flashing in different modes further comprises a bottom control box, wherein the motion sensor and the integrated chip are disposed in the bottom control box, a first circuit is further disposed in the bottom control box, the bottom control box is filled with resin glue for wrapping all devices located in the bottom control box, and the first circuit board is electrically connected to the integrated chip and is electrically connected to the light-emitting device through an external electronic connecting wire.

As shown in FIG. 1 to FIG. 4, a power supply battery is further disposed in the bottom control box and is electrically connected to the integrated chip.

As shown in FIG. 1 to FIG. 4, the light-emitting device comprises LED lights and a second circuit board, wherein the LED lights are mounted on the second circuit board, and the first circuit board is electrically connected to the second circuit board through an external electronic connecting wire.

Figure 9:
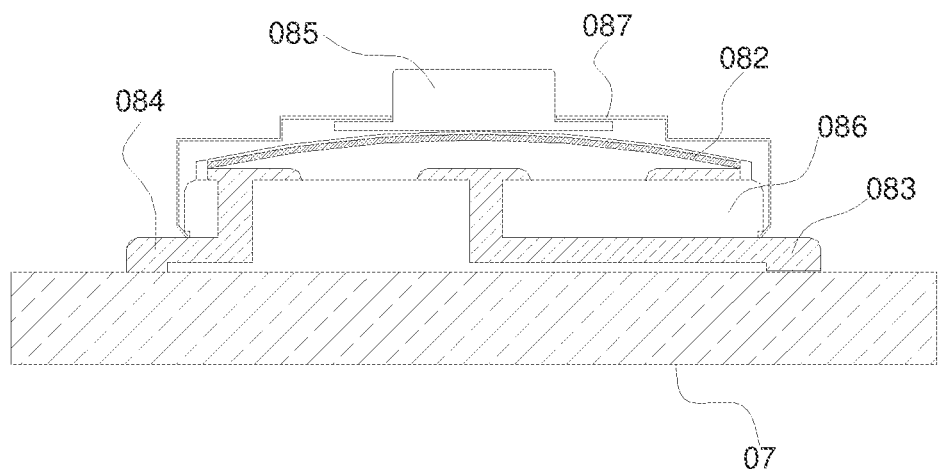
FIG. 9 is a sectional view of a control button of the shoe light device capable of flashing in different modes of the invention.

As shown in FIG. 9, the shoe light device capable of flashing in different modes further comprises a control button disposed on the shoe, wherein the control button comprises a key, an arc metal shrapnel, a positive metal contact, a negative metal contact, a metal casing and a base plate; the positive metal contact and the negative metal contact form a protruding structure through an injection molding process, a clamping notch which is concaved inwards is formed in a position, corresponding to the waist, of the protruding structure, the protruding structure is disposed on the base plate, the bottom of the protruding structure is electrically connected to the base plate, and the arc metal shrapnel, the key and the metal casing are sequentially disposed at the top of the protruding structure, and the metal casing is provided with a through hole allowing the key to stretch out and a clamping hook to be clamped in the clamping notch.

In this embodiment, the shoe light device is mainly composed of a bottom control box 05 (which is filled with resin glue to meet waterproof and impact-resisting requirements), an electronic connecting wire 06 SMT (surface mounted technology) or DIP (double in-line package), LED lights 10 and an external control button 08;

The bottom control box 05 is composed of an integrated chip (IC) 01 for controlling the LED lights, one CR power supply battery 03 or two CR power supply batteries 03 connected in series, a motion sensor 04 or a motion sensor 04S (wherein the motion sensor 04S is of a surface-mounted type), and a first circuit board 02;

The bottom control box 05 welded to one terminal of the electronic connecting wire 06 through a pad on the first circuit board 02, and the other terminal of the electronic connecting wire 06 is electrically connected to the external LED lights to drive and control the LED lights 10.

In this embodiment, the motion sensor is of the following two different structures:

Referring to FIG. 5 and FIG. 6, the motion sensor of Structure 1: the motion sensor 04 is composed of a spindle 041, a spring 042, silicone 043 and a shell 044, wherein the spindle penetrates through the center of the spring to be fixed, together with the spring, to the center of the shell 044 through the silicone 043.

As shown in FIG. 7 and FIG. 8, the motion sensor of Structure 2: the motion sensor 04S is packaged through the surface-mounted technology and is composed of a spring 042S, a metal shell 044S and a spring fastener 043S, wherein the metal shell 044S and the spring 042S are welded and electrically connected to a pad of a main control panel of the integrated chip (IC).

The LED lights 10 are mounted on the second circuit board 09 and are electrically connected to the bottom control box 05 through the pad on the second circuit board 09 by means of the electronic connecting wire 06.

As shown in FIG. 9, the control button 08 is mainly composed of a key 085, an arc metal shrapnel 082, a positive metal contact 083, a negative metal contact 084 and a metal casing 087, wherein the positive metal contact 083 and the negative metal contact 084 are injection-molded parts 086 formed through an injection molding process, the key 085 and the arc metal shrapnel 082 are fixed and positioned by the metal casing 087, and the metal casing is clamped in clamping notches in the metal contacts which are the injection-molded plastic parts formed through the injection molding process. The positive metal contact 083 and the negative metal contact 084 are electrically connected to the base plate 07 through welding.

The integrated chip (IC) 01 is composed of an 8-bit single-chip microcomputer module and is additionally provided with a voltage monitoring module and a voltage control module on the basis of basic module circuits, and other modules are common structural modules formed by single-chip microcomputers.

The power supply battery 03 is composed of two CR batteries which are connected in series (the initial voltage of the CR batteries is 3.4V, and the voltage of the two CR batteries after series connection is 6.8V). Or, the power supply battery is composed of only one CR battery. Due to the fact that the voltage control module is additionally arranged in the integrated chip (IC), the input voltage of the integrated chip (IC) can reach 2-8V.

In this embodiment, the bottom control box is mounted on a heel of a shoe outsole 11, and the LED lights 10 are inlaid in the outer side of the outsole. The electronic connecting wire 06 is mounted in a mounting groove reserved in the bottom of the shoe. The control button is mounted at any position reserved according to the design and is electrically connected to the bottom control box 05 through the electronic connecting wire 06. Similarly, the solution can also be applied to garments and suitcases and can be installed and used just like it is installed and used on shoes.

The control button 08 mainly has three functions and is operated specifically as follows:

First, overall control of on-off of the device: specifically, the control button 08 is long pressed for 0.5 s to enable this function;

Second, control and turn-off of the brightness: specifically, in the on state, the control button 08 is long pressed for 0.5 s to gradually decrease the brightness of the LED lights from the original 100% by a gradient of 10%, and the LED lights are turned off when the brightness is decreased to 30%; that is, under the condition where the LED lights are on, the brightness of the LED lights starts to attenuate from 100% after the control button 08 is long pressed by 0.5 s. The brightness is decreased by 10% every 0.5 s, the LED lights are turned off 3.5 s later, and the brightness can be decreased to 50% by pressing the control button 08 for 2.5 s.

It should be noted that before entering into this operating mode, the LED light (L1) works and displays the corresponding brightness, and the other LED lights (L2-L6) do not work.

The control button 08 also has a flashing sequence switch function; specifically, under the condition where the LED lights are on, the flashing mode is switched every time the control button is pressed. (Briefly, the flashing mode is switched once every moment the control button is pressed, and the specific modes are implemented by sequences A-H.)

Operating principle of the control button: when the contact of the control button 08 is pressed, the arc metal shrapnel 082 in the control button deforms to 25 realize electrical connection of the positive metal contact 083 and the negative metal contact 084, and the potential of an input terminal of the integrated chip (IC) 01 is pulled to a low voltage from a high level. At this moment, a counter in the single-chip microcomputer works and the whole device is started 0.5 s later. In a standby state, the contact is short touched to switch the flashing mode, and this operating principle is the same as the starting principle, except that the recorded time is decreased to 50 milliseconds from 0.5 second. The brightness control and turn-off function is also the same as the starting principle.

The operating principle of the shoe light device capable of flashing in different modes of the invention is as follows:

Under the condition where the device is in a standby state, when the shoe moves (namely, a wearer moves), a resilience force will be generated at the moment the bottom of the shoe touches the ground under the effect of the gravity of the shoe and the acceleration of the wearer; this resilience force is transmitted to the spring 042 of the motion sensor 04 through the bottom of the shoe and the bottom control box 05, at this moment, the spring 042 in the motion sensor 04 vibrates vertically under the effect of the external force, and when the amplitude of vibration exceeds the radius of the spring, the spring 042 intermittently contacts with the spindle 041. As shown in FIG. 5 and FIG. 6, at the moment the spring 042 knocks and contacts with the spindle 041 in the spring, the motion sensor 04 sends a series of pulse signals to a tenth input port of the IC 01 because the spindle 041 is connected to the negative pole of the power supply battery 03 (or, as shown in FIG. 7 and FIG. 8, this resilience force is transmitted to a spring operating end 042SB of the spring 042S through the bottom of the shoe and the bottom control box 05, at this moment, the spring operating end 042SB vertically vibrates under the effect of the external force, and when the spring operating end 042SB vibrates to a certain height and touches the metal shell 044S, the spring 042S intermittently contacts with the metal shell 044S; at the moment the spring operating end 042SB knocks and contacts with the metal shell 044S, the motion sensor 04S sends a series of pulse signals to the tenth input port of the IC 01 because the metal shell 044S is connected to the negative pole of the power supply battery 03, wherein a spring welding end 042SA is to be welded and electrically connected to a pad of a main control panel of the IC).

Figure 10:
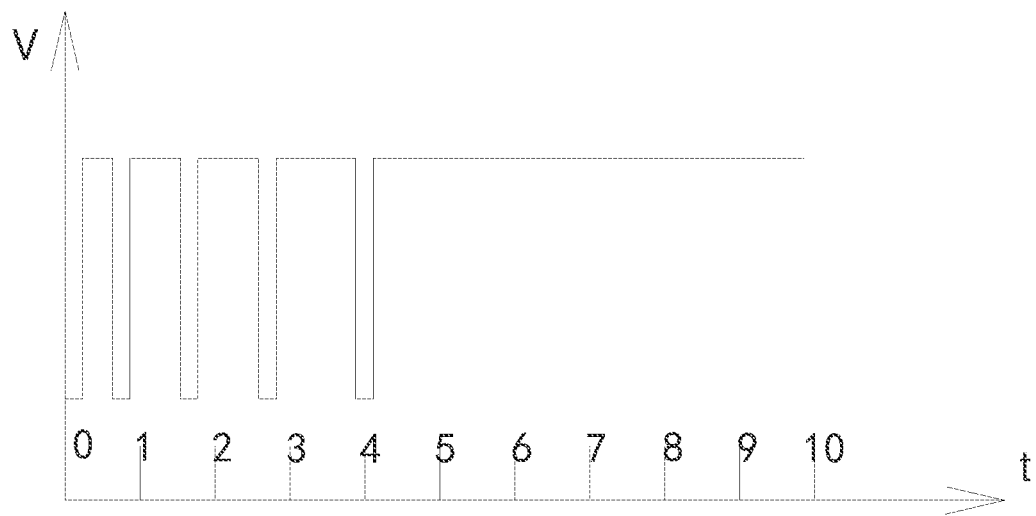
FIG. 10 is a schematic diagram of pulse signals generated when the motion sensor of the invention is triggered.

As shown in FIG. 10, the IC receives and counts the pulse signals; when the duration of reception of the pulse signals reaches 10 milliseconds, the reception of the pulse signals is stopped, and the device is started; at this moment, all the modules in the IC are switched to an operating mode from a standby dormant mode, and the LED lights are driven to emit light in a constant-sequence output mode. (The specific operating sequences A-H are explained below.)

Figure 11:
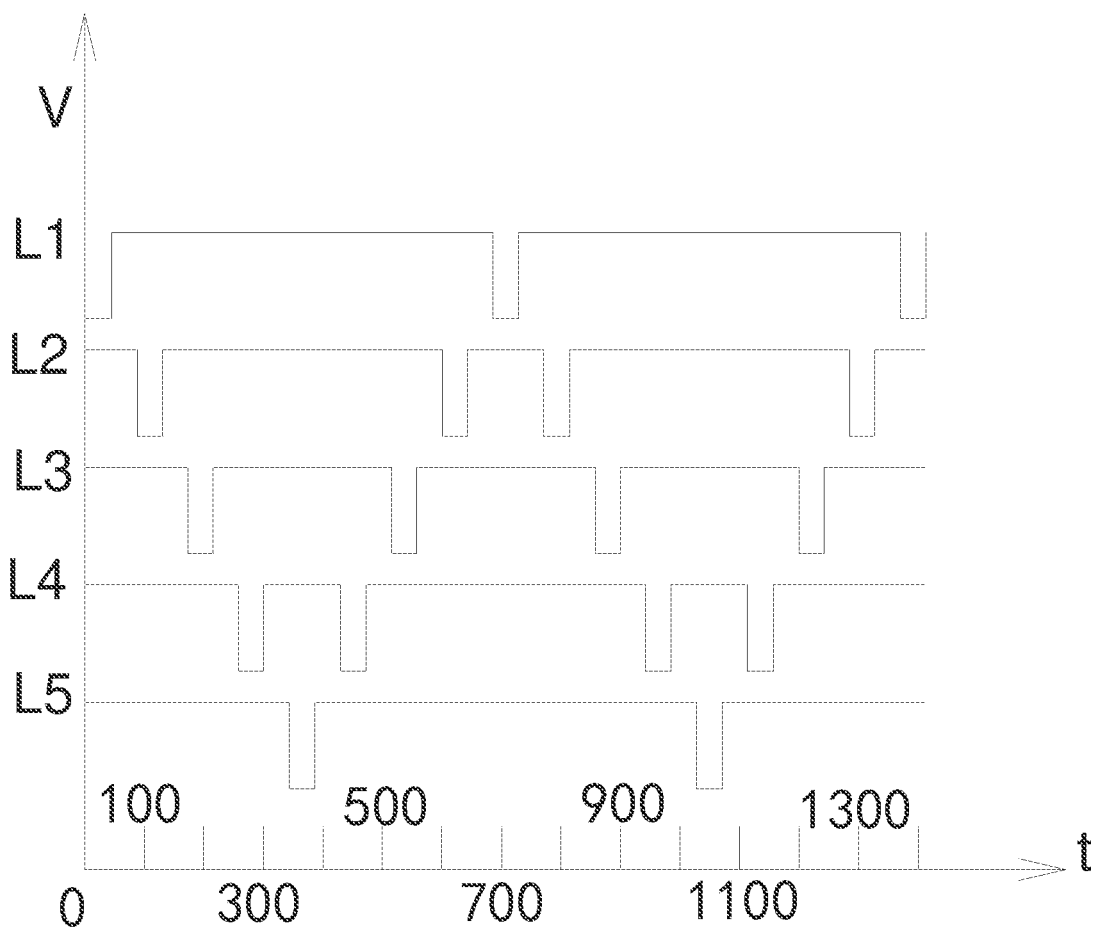
FIG. 11 is a schematic diagram of an operating mode by sequence A of the shoe light device capable of flashing in different modes of the invention.

Wherein, as shown in FIG. 11, the operating mode by sequence A is as follows:

0-40MS: the LED light L1 works; 40-80MS: all the LED lights are turned off;

80-120MS: the LED light L2 works; 120-160MS: all the LED lights are off;

160-200MS: the LED light L3 works; 200-240MS: all the LED lights are off;

240-280MS: the LED light L4 works; 280-320MS: all the LED lights are off;

320-360MS: the LED light L5 works; 360-400MS: all the LED lights are off;

400-440MS: the LED light L4 works.

This process is reversely repeated four times at this frequency (that is, first time: L1-L5; second time: L5-L1; third time: L1-L5; and fourth time: L5-L1) to form a complete work cycle which lasts for 1440MS.

Figure 12:
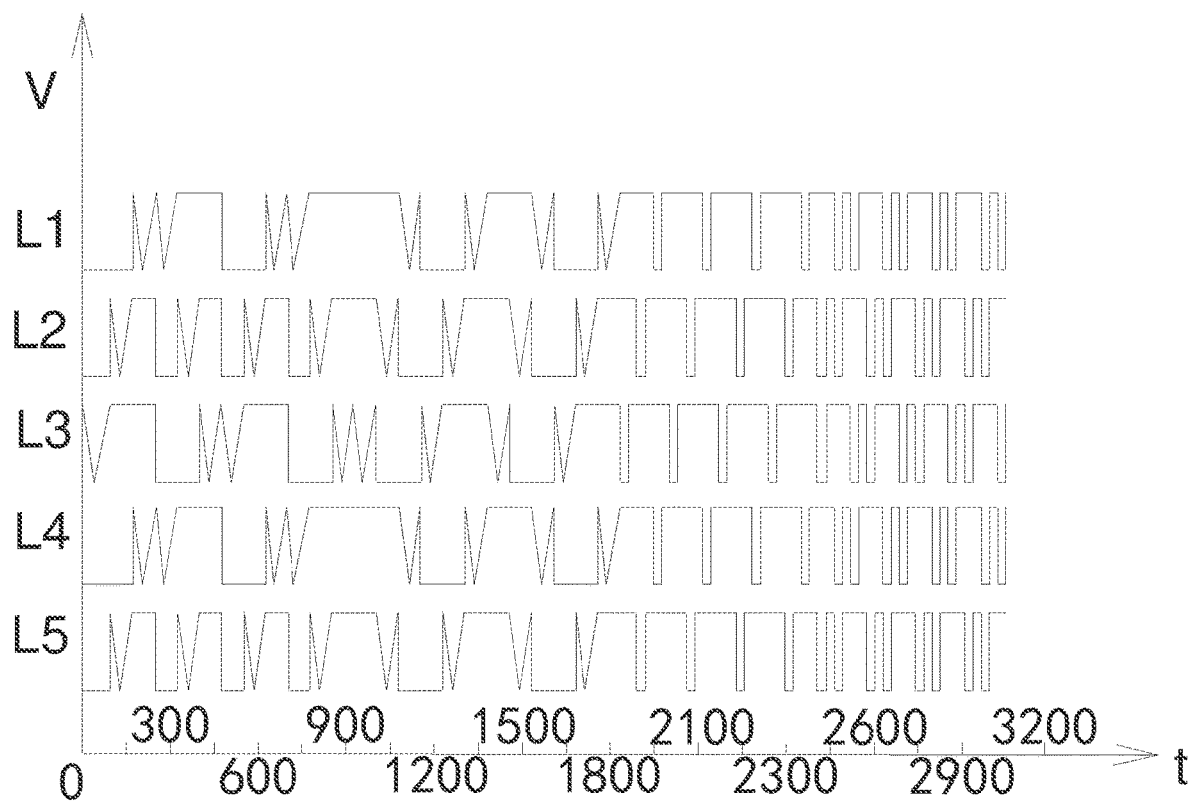
FIG. 12 is a schematic diagram of an operating mode by sequence B of the shoe light device capable of flashing in different modes of the invention.

Wherein, as shown in FIG. 12, the operating mode by sequence B is as follows:

0-95MS: L1 and L2 are on, and L3 becomes brighter gradually and is finally off;

95-175MS: L1 is on, L2 becomes brighter gradually and is finally off, and L3 does not work;

175-250MS: L1 becomes brighter gradually and is finally off, and L2 and L3 do not work;

250-320MS: L1 becomes brighter gradually and is finally off, and L2 and L3 are on;

320-395MS: L1 does not work, L2 becomes brighter gradually and is finally off, and L3 is fully on;

395-457MS: L1 and L2 do not work, and L3 becomes brighter gradually and is finally off;

475-550MS: L1 and L2 are fully on, and L3 becomes brighter gradually and is finally off;

550-620MS: L1 is on, L2 becomes brighter gradually and is finally off, and L3 does not work;

620-700MS: L1 becomes brighter gradually and is finally off, and L2 and L3 do not work;

700-775MS: L1 becomes brighter gradually and is finally off, and L2 and L3 are on;

775-850MS: L1 does not work, L2 becomes brighter gradually and is finally off, and L3 is fully on;

850-930MS: L1 and L2 do not work, and L3 becomes brighter gradually and is finally off;

930-1000MS: L1 and L2 do not work, and L3 becomes brighter gradually and is finally off;

1000-1080MS: L1 does not work, L2 becomes brighter gradually and is finally off, and L3 is fully on;

1080-1150MS: L1 becomes brighter gradually and is finally off, and L2 and L3 are fully on;

1150-1230MS: L1 and L2 are fully on, and L3 becomes brighter gradually and is finally off;

1230-1300MS: L1 is fully on, L2 becomes brighter gradually and is finally off, and L3 does not work;

1300-1380MS: L1 becomes brighter gradually and is finally off, and L2 and L3 do not work;

1380-1450MS: L1 and L2 do not work, and L3 becomes brighter gradually and is finally off;

1450-1530MS: L1 does not work, L2 becomes brighter gradually, and L3 is fully on;

1530-1600MS: L1 becomes brighter gradually and is finally off, and L2 and L3 are fully on;

1600-1680MS: L1 and L2 are fully on, and L3 becomes brighter gradually and is finally off;

1680-1760MS: L1 is fully on, L2 becomes brighter gradually and is finally off, and L3 does not work;

1760-1840MS: L1 becomes brighter gradually and is finally off, and L2 and L3 do not work;

1840-1870MS: L3 is on, and L1 and L2 do not work;
1870-1895MS: L1, L2 and L3 do not work;
1895-1925MS: L2 is on, and L1 and L3 do not work;
1925-1950MS: L1, L2 and L3 do not work;
1950-1975MS: L1 is on, and L3 and L2 do not work;
1975-2005MS: L1, L2 and L3 do not work;
2005-2035MS: L3 is on, and L1 and L2 do not work;
2035-2060MS: L1, L2 and L3 do not work;
2060-2090MS: L2 is on, and L1 and L3 do not work;
2090-2115MS: L1, L2 and L3 do not work;
2115-2145MS: L1 is on, and L2 and L3 do not work;
2145-2175MS: L1, L2 and L3 do not work;
2175-2200MS: L3 is on, and L1 and L2 do not work;
2200-2230MS: L1, L2 and L3 do not work;
2230-2260MS: L2 is on, and L1 and L3 do not work;
2260-2280MS: L1, L2 and L3 do not work;
2280-2315MS: L1 is on, and L2 and L3 do not work;
2315-2345MS: L1, L2 and L3 do not work;
2345-2370MS: L3 is on, and L1 and L2 do not work;
2370-2395MS: L1, L2 and L3 do not work;
2395-2425MS: L2 is on, and L1 and L3 do not work;
2425-2455MS: L1, L2 and L3 do not work;
2455-2480MS: L1 is on, and L2 and L3 do not work;
2480-2510MS: L1, L2 and L3 do not work;
2510-2540MS: L2 and L3 are on, and L1 does not work;
2540-2565MS: L1, L2 and L3 do not work;
2565-2595MS: L2 and L1 are on, and L3 does not work;
2595-2620MS: L1, L2 and L3 do not work;
2620-2650MS: L1 and L3 are on, and the L2 does not work;
2650-2680MS: L1, L2 and L3 do not work;
2680-2705MS: L2 and L3 are on, and L1 does not work;
2705-2730MS: L1, L2 and L3 do not work;
2730-2760MS: L2 and L1 are on, and L3 does not work;
2760-2780MS: L1, L2 and L3 do not work;
2780-2820MS: L2 and L3 are on, and L2 does not work;
2820-2845MS: L1, L2 and L3 do not work;
2845-2870MS: L2 and L3 are on, and L1 does not work;
2870-2900MS: L1, L2 and L3 do not work;
2900-2930MS: L1 and L2 are on, and L3 does not work;
2930-2960MS: L1, L2 and L3 do not work;
2965-2985MS: L1 and L3 are on, and L2 does not work;
2985-3010MS: L1, L2 and L3 do not work;
3010-3040MS: L2 and L3 are on, and L1 does not work;
3040-3070MS: L1, L2 and L3 do not work;
3070-3095MS: L1 and L3 are on, and L2 does not work;
3095-3125MS: L1, L2 and L3 do not work;
3125-3150MS: L1 and L3 are on, and L2 does not work;

The time sequence of the LED light L1 is the same as that of the LED light L4, and the time sequence of the LED light L2 is the same as that of the LED light L5, and one work cycle lasts for 3150MS.

Figure 13:
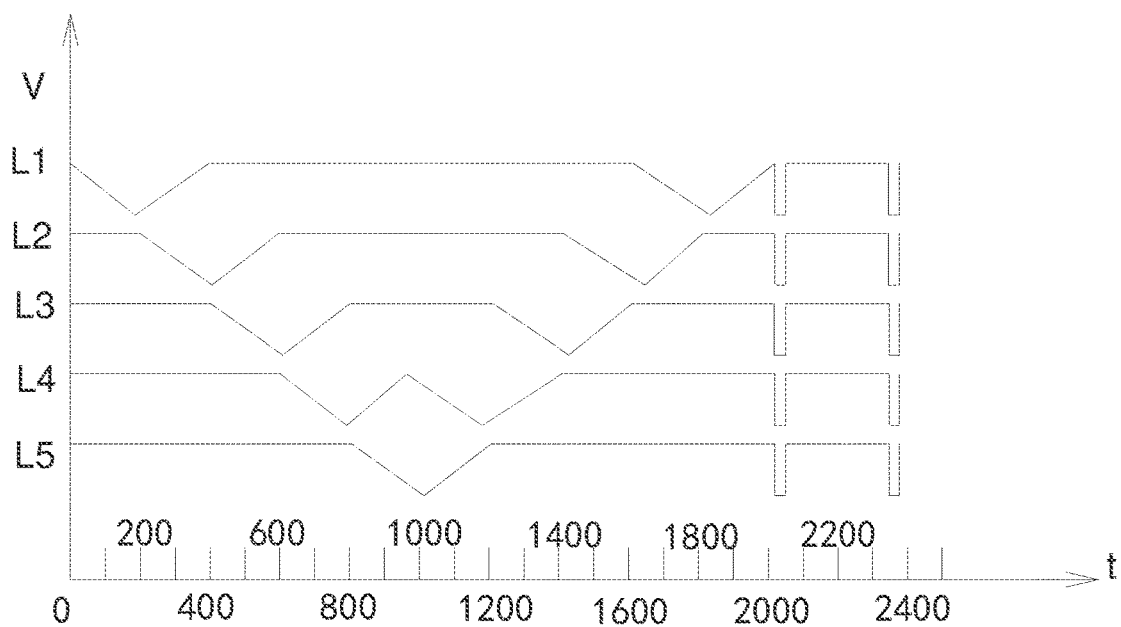
FIG. 13 is a schematic diagram of an operating mode by sequence C of the shoe light device capable of flashing in different modes of the invention.

Wherein, as shown in FIG. 13, the operating mode by sequence C is as follows:

0-200MS: L1 gradually turns brightest from 0, and the other LED lights do not work;

200-400MS: L1 gradually turns to 0 from the maximum brightness, L2 turns the brightest from 0, and the other LED lights do not work;

400-600MS: L2 gradually turns to 0 from the maximum brightness, L3 gradually turns the brightest from 0, and the other LED lights do not work;

600-800MS: L3 gradually turns to 0 from the maximum brightness, L4 gradually turns the brightest from 0, and the other LED lights do not work;

800-1000MS: L4 gradually turns to 0 from the maximum brightness, L5 gradually turns the brightest from 0, and the other LED lights do not work;

1000-1200MS: L5 gradually turns to 0 from the maximum brightness, L4 gradually turns the brightest from 0, and the other LED lights do not work;

1200-1400MS: L4 gradually turns to 0 from the maximum brightness, L3 gradually turns the brightest from 0, and the other LED lights do not work;

1400-1600MS: L3 gradually turns to 0 from the maximum brightness, L2 gradually turns the brightest from 0, and the other LED lights do not work;

1600-1800MS: L2 gradually turns to 0 from the maximum brightness, L1 gradually turns the brightest from 0, and the other LED lights do not work;

1800-2000MS: L1 gradually turns to 0 from the maximum brightness, and the other LED lights do not work;

2000-2040MS: all the LED lights work;

2040-2340MS: all the LED lights do not work;

2340-2380MS: all the LED lights work;

One work cycle lasts for 2380MS.

Figure 14:
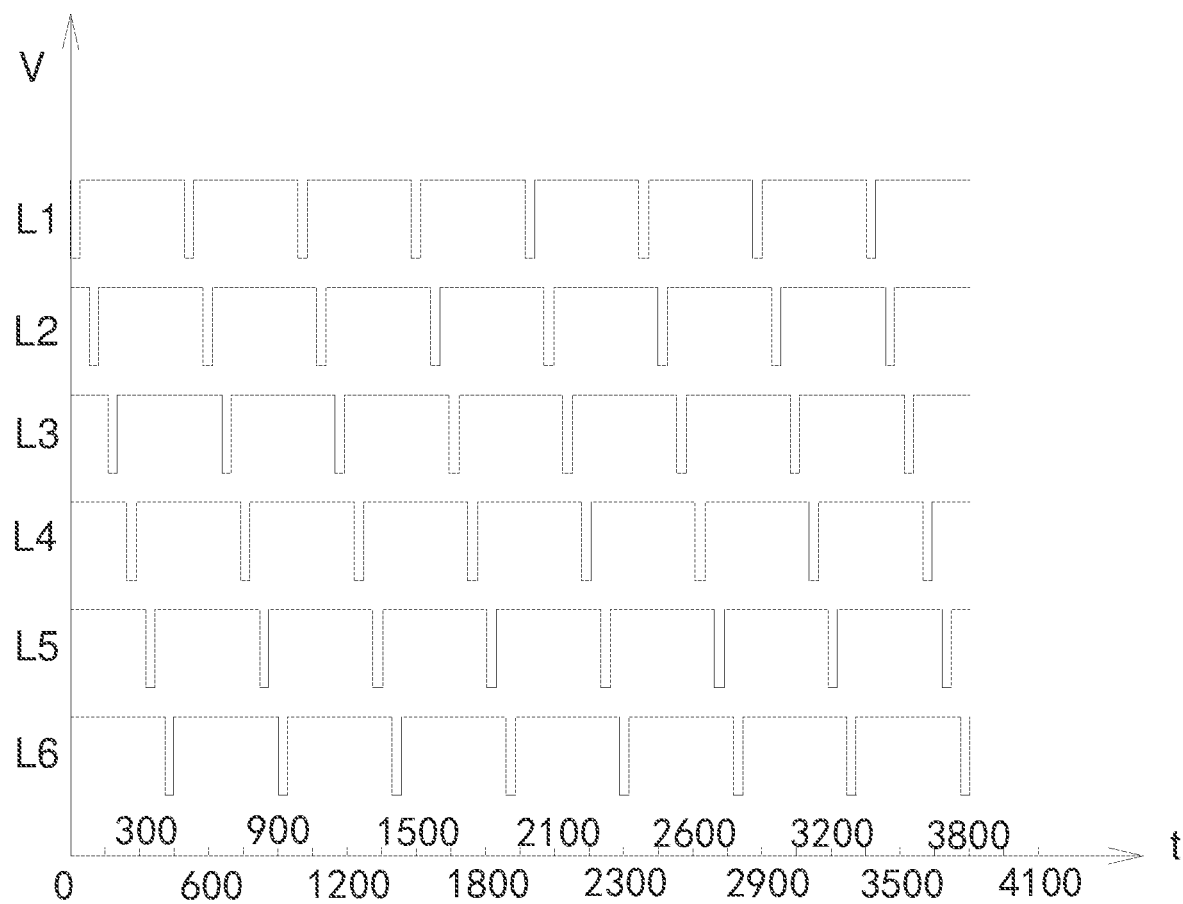
FIG. 14 is a schematic diagram of an operating mode by sequence D of the shoe light device capable of flashing in different modes of the invention.

Wherein, as shown in FIG. 14, the operating mode by sequence D is as follows:

0-40MS: the LED light L1 works;
40-80MS: all the LED lights are off;
80-120MS: the LED light L2 works;
120-160MS: all the LED lights are off;
160-200MS: the LED light L3 works;
200-240MS: all the LED lights are off;
240-280MS: the LED light L4 works;
280-320MS: all the LED lights are off;
320-360MS: the LED light L5 works;
360-400MS: all the LED lights are off;
400-440MS: the LED light L6 works;
440-480MS: all the LED lights are off;
480-520MS: the LED light L1 works.

This process is directly repeated eight times at this frequency (that is: L1-L6 continuously works eight times) to form a complete work cycle which last for 3840MS.

Figure 15:
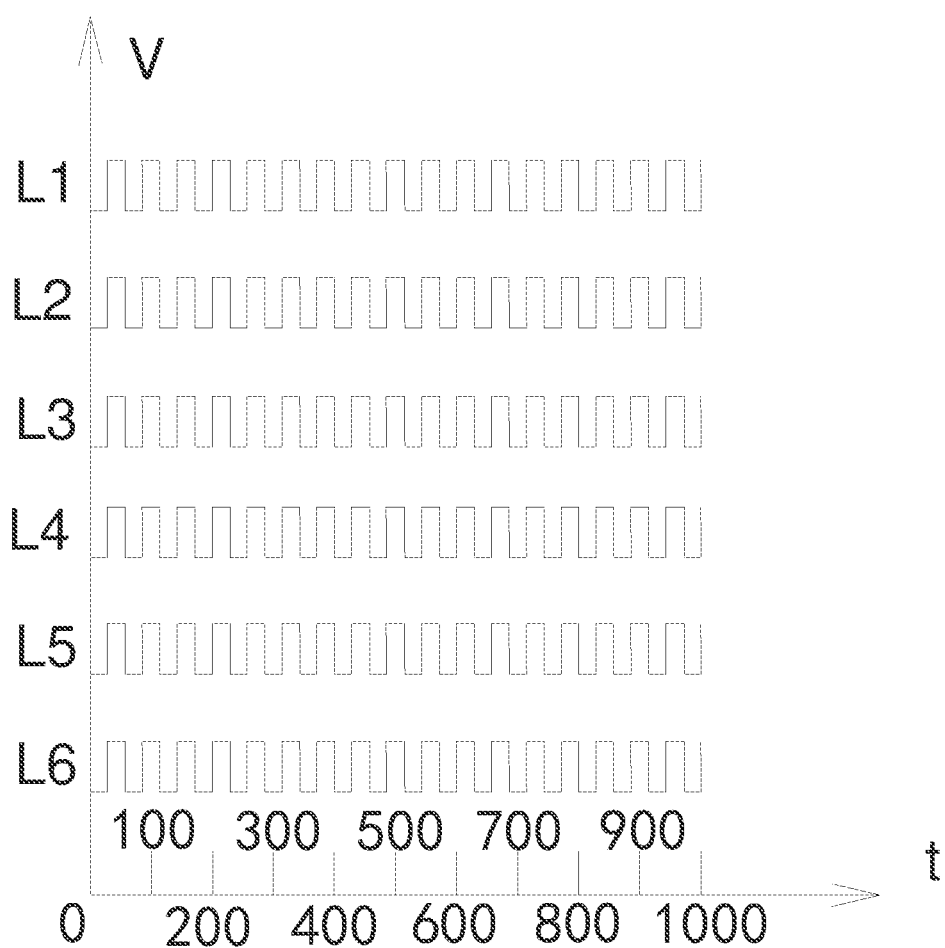
FIG. 15 is a schematic diagram of an operating mode by sequence E of the shoe light device capable of flashing in different modes of the invention.

Wherein, as shown in FIG. 15, the operating mode by sequence E is as follows:

0-27.5MS: all the LED lights work;
27.5-55MS: all the LED lights are off;

This process is repeated eighteen times at this frequency (that is: L1-L6 continuously flash in the same manner eighteen times) to form a complete work cycle which last for 990MS.

Figure 16:
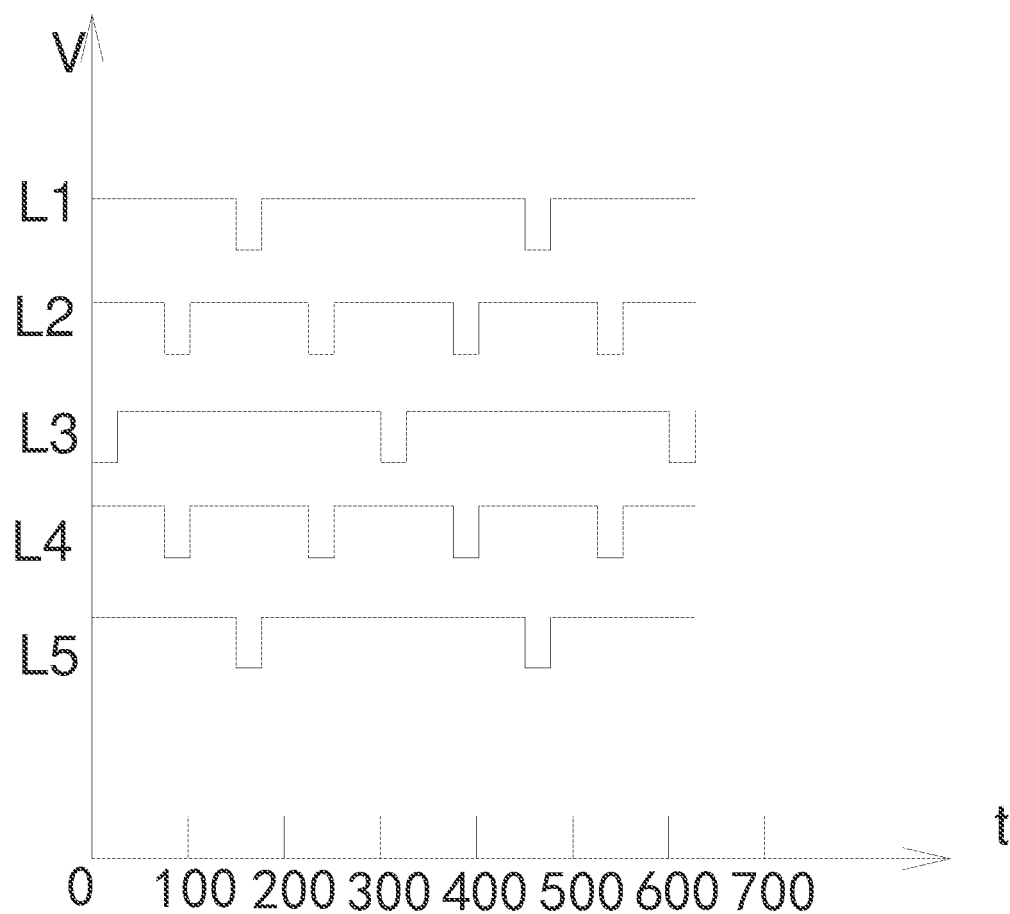
FIG. 16 is a schematic diagram of an operating mode by sequence F of the shoe light device capable of flashing in different modes of the invention.

Wherein, as shown in FIG. 16, in operating mode by time sequence F is as follows:

0-30MS: the LED light L3 works, and the other LED lights do not work;
30-80MS: all the LED lights are off;
80-110MS: the LED lights L2 and L4 work, and the other LED lights do not work;
110-160MS: all the LED lights are off;
160-190MS: the LED lights L1 and L5 work, and the other LED lights do not work;
190-240MS: all the LED lights are off;
240-270MS: the LED lights L2 and L4 work, and the other LED lights do not work;
270-320MS: all the LED lights are off;
320-370MS: the LED lights L3 works, and the other LED lights do not work;
370-420MS: all the LED lights are off;
420-450MS: the LED lights L2 and L4 work, and the other LED lights do not work;
450-500MS: all the LED lights are off;
500-530MS: the LED lights L1 and L5 work, and the other LED lights do not work;
530-580MS: all the LED lights are off;
580-610MS: the LED light L3 works, and the other LED lights do not work.

A complete work cycle lasts for 610MS.

Figure 17:
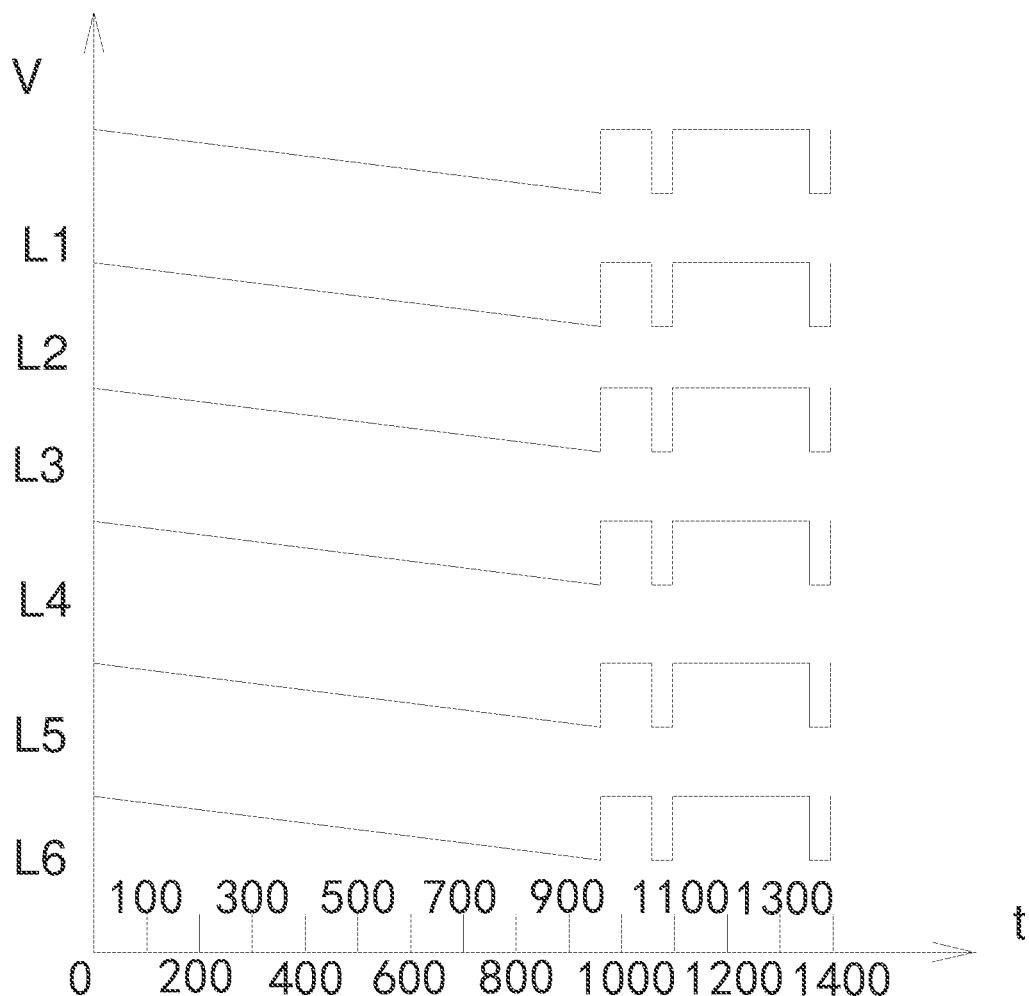
FIG. 17 is a schematic diagram of an operating mode by sequence G of the shoe light device capable of flashing in different modes of the invention.

Wherein, as shown in FIG. 17, the operating mode by time sequence G is as follows:

0-950MS: all the LED lights gradually become brighter and finally reach the maximum brightness.
950-1050MS: all the LED lights are off.
1050-1100MS: all the LED lights work.
1100-1350MS: all the LED lights are off.
1350-1400MS: all the LED lights work.

A complete cycle lasts for 1400MS.

Figure 18:
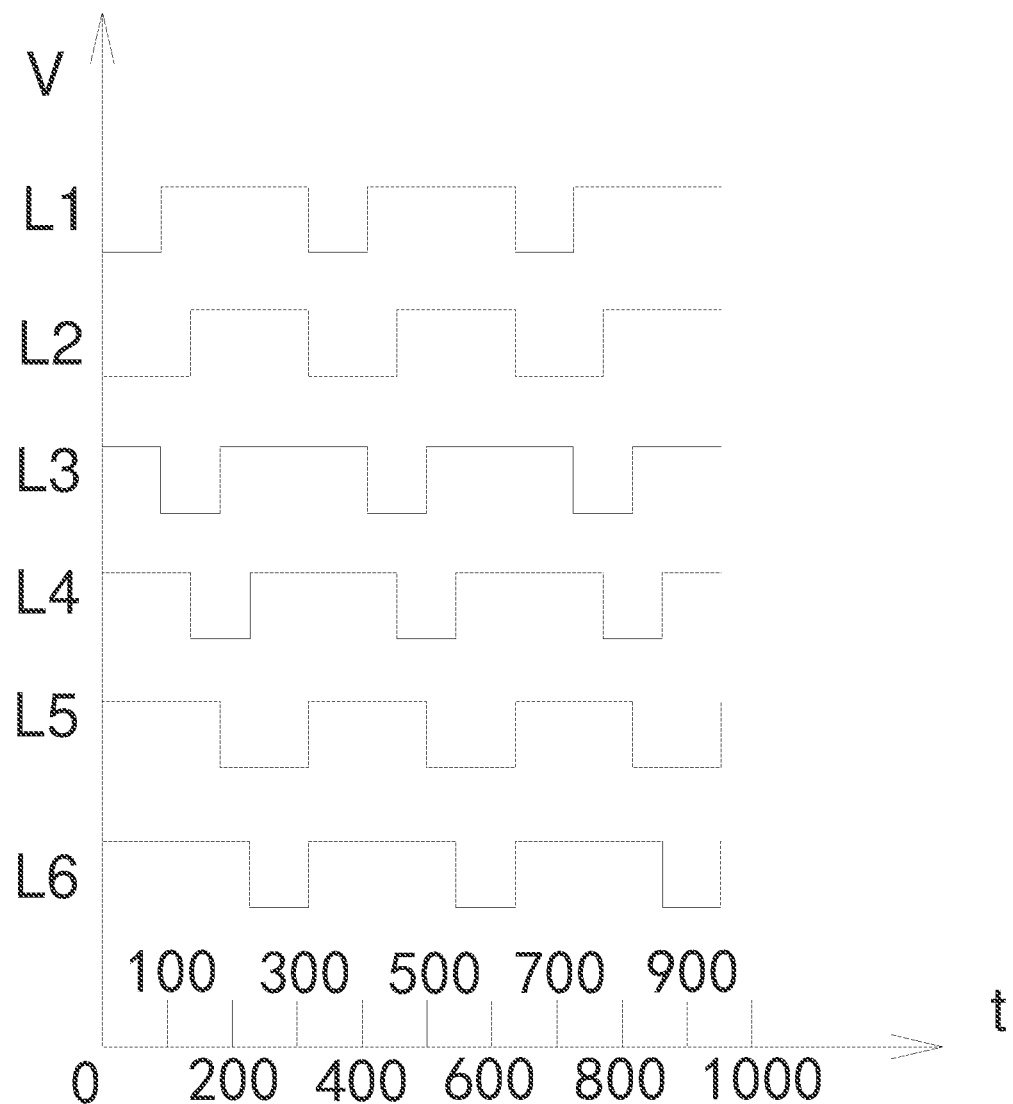
FIG. 18 is a schematic diagram of an operating mode by sequence H of the shoe light device capable of flashing in different modes of the invention.

Wherein, as shown in FIG. 18, the operating mode by sequence H is as follows:

0-90MS: the LED lights L1 and L2 work, and the other LED lights are off;
90-135MS: the LED lights L2 and L3 work, and the other LED lights are off;
135-180MS: the LED lights L3 and L4 work, and the other LED lights are off;
180-225MS: the LED lights L4 and L5 work, and the other LED lights are off;
225-315MS: the LED lights L5 and L6 work, and the other LED lights are off;
315-405MS: the LED lights L1 and L2 work, and the other LED lights are off;
405-450MS: the LED lights L2 and L3 work, and the other LED lights are off;
450-495MS: the LED lights L3 and L4 work, and the other LED lights are off;
495-540MS: the LED lights L4 and L5 work, and the other LED lights are off;
540-630MS: the LED lights L5 and L6 work, and the other LED lights are off;
630-720MS: the LED lights L1 and L2 work, and the other LED lights are off;
720-765MS: the LED lights L2 and L3 work, and the other LED lights are off;
765-810MS: the LED lights L3 and L4 work, and the other LED lights are off;
810-855MS: the LED lights L4 and L5 work, and the other LED lights are off; and
855-945MS: the LED lights L5 and L6 work, and the other LED lights are off.

A complete work cycle lasts for 945MS.

Wherein, turn-on prompt sequence: all the LED lights synchronously flash three times at a frequency of 2 Hz and a duty cycle of 90%;

Turn-off prompt sequence: all the LED lights flash once for 50MS;

Brightness-control prompt sequence: L1 works, and the brightness is synchronous with brightness control.

Referring to FIG. 19, Embodiment 2 of the invention is as follows:

The invention further provides a driving method of the shoe light device capable of flashing in different modes. The driving method comprises the following steps:

When the motion sensor recognizes a resilience force generated at the moment the bottom of the shoe touches the ground, a series of pulse signals is sent to the integrated chip;

The integrated chip receives and counts the pulse signals, and the time at this moment is recorded to obtain the duration of reception of the pulse signals; and The integrated chip determines whether or not the duration of reception of the pulse signals reaches a preset threshold; if so, the integrated chip controls the light-emitting device to emit light in a preset constant-sequence output mode.

Wherein, the preset threshold is 10 milliseconds.

Furthermore, the driving method further comprises the following steps:

The integrated chip receives a signal input through the control button, and an output in a corresponding mode is implemented according to the signal input through the control button.

To sum up, according to the shoe light device capable of flashing in different modes and the driving method thereof, the motion sensor, the integrated chip and the light-emitting device are integrated on the shoe, and the motion sensor and the light-emitting device are electrically connected to the integrated chip; and the integrated chip is configured to control the light-emitting device to emit light in a preset constant-sequence output mode when the duration of reception of pulse signals generated by the motion sensor reaches a preset threshold, so that trigger control over the light-emitting device is realized. The shoe light device capable of flashing in different modes of the invention has the following advantages: the integrity of elements is high, the structure and the production process are simple, and the light-emitting device has various integrated cyclic output modes for flashing; the elements of a control circuit of the device are highly integrated, only one main control IC is needed, no peripheral electronic devices are needed, the structure is simple, the production process is simple, and various integrated cyclic output modes for flashing (including quick flashing, slow flashing and flashing with variable brightness) are realized, the display brightness can be controlled (through the external control button; the device can be switched to different flashing modes; when the device is not needed, the LED lights can be turned off; the brightness of the LED lights can be controlled at night), the standby power consumption is ultra-low (less than 0.2UA), the output power is high (the output power of a single output port can reach 100MA), and the input voltage is high (the input voltage reaches 3-8V). Because the main control IC is highly integrated and is additionally provided with a corresponding power management module, the standby power consumption of the main control IC under an input voltage of 8V is less than 0.2UA, and the defects of common main control ICs on the present market that the maximum input voltage is 5V, the standby power consumption is 3-5UA, and a series of auxiliary devices such as capacitors and diodes need to be additionally disposed at the power input terminal are overcome. Two CR batteries can be connected in series to supply power to the IC to meet the requirement for a high input voltage. However, if the voltage of an existing common control IC exceeds 6V, the IC will be damaged.

The above description is merely for explaining the embodiments of the invention, and is not intended to limit the patent scope of the invention. All equivalent transformations made according to the contents of the specification and the accompanying drawings, or direct or indirect applications to relating technical fields should also fall within the patent protection scope of the invention.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A control circuit for controlling an electrical current supplied to a plurality of LED lights in a shoe comprising:
   a shoe, the shoe including a lower portion for engaging a ground surface, an outer wall of the shoe constructed and arranged for surrounding a portion of a foot,
   a first control board integrated into the shoe, the first control board being electrically connected to remote mounted electronics to send electric signals to the remote electronics and receive electric signals therefrom,
   the first control board including an integrated chip electrically connected to the control board to receive the electrical signals through the control board and to send electrical signals from the control board based upon the electric signals received from the remote electronics, the integrated chip including a processor for making decisions based upon the received electric signals, the integrated processor also including memory for storing decision making programming as well as more than one light sequences for causing a plurality of light emitting diodes to illuminate, the light sequences determined by the integrated processor using the decision making programming;
   a power supply electrically connected to the first control board for supplying electrical power to the first control board and the integrated processor;
   said plurality of light emitting diodes electrically connected to the first control board;
   a motion sensor positioned in the lower portion of the shoe and electrically connected to the first control board, the motion sensor constructed and arranged to recognize a resilience force generated when the lower portion of the shoe contacts the ground surface sending a series of electric pulses to the integrated chip;
   wherein the integrated chip receives the electric pulses from the motion sensor and chooses the light sequences causing the light emitting diodes to illuminate in a pattern.

2. The control circuit for controlling the electrical current supplied to a plurality of LED lights in a shoe of claim 1 wherein the integrated chip receives and counts the electric pulses provided by the motion sensor, and the time over which the electric pulses were received, the decision making programming utilizing this information to decide which, if any, light sequence to initiate.

3. The control circuit for controlling the electrical current supplied to a plurality of LED lights in a shoe of claim 1 wherein the integrated chip is an 8-bit single-chip microcomputer module.

4. The control circuit for controlling the electrical current supplied to a plurality of LED lights in a shoe of claim 3 wherein the integrated chip is additionally provided with a voltage monitoring module and a voltage control module for monitoring and controlling the electric signals received and sent from the integrated chip.

5. The control circuit for controlling the electrical current supplied to a plurality of LED lights in a shoe of claim 1 wherein the plurality of light emitting diodes are mounted for electrical connection upon a second circuit board, the control board connected to the second circuit board through wires.

6. The control circuit for controlling the electrical current supplied to a plurality of LED lights in a shoe of claim 5 wherein the second circuit board is secured within the shoe to be visible through an outer surface of the shoe.

7. The control circuit for controlling the electrical current supplied to a plurality of LED lights in a shoe of claim 5 wherein the second circuit board is secured on an outer surface of the shoe.

8. The control circuit for controlling the electrical current supplied to a plurality of LED lights in a shoe of claim 1 wherein a minimum threshold of 10 milliseconds of electrical pulses must be supplied from the motion sensor to the integrated chip to cause the light emitting diodes to illuminate.

9. The control circuit for controlling the electrical current supplied to a plurality of LED lights in a shoe of claim 1 wherein the motion sensor detects the amount of motion and varies an electrical signal provided to the integrated chip such that the integrated chip determines which light sequence to display based upon the electrical signal provided from the motion sensor.

10. The control circuit for controlling the electrical current supplied to a plurality of LED lights in a shoe of claim 9 including a control button operable by a user to send an electrical signal to the integrated chip to cause a light sequence to be manually displayed.

11. The control circuit for controlling the electrical current supplied to a plurality of LED lights in a shoe of claim 10 wherein the control button operates a flashing sequence function within the integrated chip to switch the sequence of LED light flashing every moment the control button is pushed.

12. The control circuit for controlling the electrical current supplied to a plurality of LED lights in a shoe of claim 10 wherein the control button is utilized for controlling the brightness of the LED lights when illuminated.

13. The control circuit for controlling the electrical current supplied to a plurality of LED lights in a shoe of claim 10 wherein the control button is utilized for turning the LED lights off to conserve power.

14. The control circuit for controlling the electrical current supplied to a plurality of LED lights in a shoe of claim 1 wherein the integrated chip includes a power management module; the power management module reducing the standby power consumption of the integrated chip under an input voltage of 8V is less than 0.2UA.

* * * * *